US011886526B2

(12) United States Patent
Joshy (10) Patent No.: US 11,886,526 B2
(45) Date of Patent: *Jan. 30, 2024

(54) CUSTOMIZED NAVIGATION FLOW (71) Applicant: Capital One Services, LLC, McLean, VA (US)

(72) Inventor: Rendheer Joshy, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,637

(22) Filed: May 2, 2022

(65) Prior Publication Data

US 2022/0261446 A1 Aug. 18, 2022

Related U.S. Application Data

(63) Continuation of application No. 17/089,029, filed on Nov. 4, 2020, now Pat. No. 11,321,412.

(51) Int. Cl.
*G06F 16/954* (2019.01)
*G06F 16/958* (2019.01)
*G06F 16/957* (2019.01)

(52) U.S. Cl.
CPC .......... *G06F 16/954* (2019.01); *G06F 16/957* (2019.01); *G06F 16/958* (2019.01)

(58) Field of Classification Search
CPC ..... G06F 16/954; G06F 16/957; G06F 16/958
USPC ........................................................ 715/733
See application file for complete search history.

(56) References Cited

U.S. PATENT DOCUMENTS

| | | | |
|---|---|---|---|
| 5,999,908 A * | 12/1999 | Abelow | G06Q 30/0203 434/118 |
| 6,092,074 A | 7/2000 | Rodkin et al. | |
| 6,529,910 B1 * | 3/2003 | Fleskes | G06F 16/958 707/804 |
| 6,901,380 B1 * | 5/2005 | Bremers | G06Q 30/06 705/26.81 |
| 6,976,090 B2 | 12/2005 | Ben-Shaul et al. | |
| 7,200,804 B1 | 4/2007 | Khavari et al. | |
| 7,213,202 B1 * | 5/2007 | Kagle | G06F 40/151 715/235 |
| 7,249,197 B1 * | 7/2007 | Roestenburg | G06Q 30/02 709/217 |
| 7,877,407 B2 | 1/2011 | Smith, III | |
| 8,219,934 B2 | 7/2012 | MacHeffner | |
| 8,595,300 B2 | 11/2013 | Underwood et al. | |

(Continued)

*Primary Examiner* — Andrew R Dyer
(74) *Attorney, Agent, or Firm* — Banner & Witcoff, Ltd.

(57) ABSTRACT

Methods and systems as described herein may enable customized navigation flow for websites/applications. Navigation flows (e.g., the pages, user interfaces, views, etc. that are displayed to a user) may be customized for each user. Navigation parameters may be generated for a user and may indicate a customized navigation flow for the user. The navigation parameters may indicate one or more pages of a website/application and an order that each of the one or more pages should be displayed to the user. The navigation parameters may indicate a trigger for each page. A trigger may indicate an action and/or event that causes a change in display to the next page in the navigation flow. Navigation parameters may be shared between devices, which may enable the user to experience the same navigation flow across multiple websites/applications.

20 Claims, 8 Drawing Sheets

(56) References Cited

U.S. PATENT DOCUMENTS

| | | | |
|---|---|---|---|
| 8,640,021 B2* | 1/2014 | Perez | H04N 21/4661 |
| | | | 715/203 |
| 9,128,918 B2 | 9/2015 | Travieso et al. | |
| 9,195,632 B2* | 11/2015 | Garcia-Martinez | G06F 17/00 |
| 9,374,431 B2* | 6/2016 | Kannan | G06F 16/954 |
| 9,779,457 B1* | 10/2017 | Fisher | G06F 3/0482 |
| 10,122,824 B1 | 11/2018 | Chokhawala et al. | |
| 10,198,524 B1* | 2/2019 | Amalapurapu | G06F 16/958 |
| 10,325,000 B2* | 6/2019 | Gottlob | G06F 16/284 |
| 10,402,465 B1* | 9/2019 | Jain | H04L 67/535 |
| 10,552,866 B2* | 2/2020 | Muppirala | G06Q 30/0258 |
| 10,664,146 B2* | 5/2020 | Andrizzi | G06Q 30/0641 |
| 10,747,939 B1 | 8/2020 | Oksendahl et al. | |
| 10,943,063 B1* | 3/2021 | Mccown | G06F 21/31 |
| 11,127,078 B1* | 9/2021 | Fisher | G06F 3/04817 |
| 2002/0010715 A1* | 1/2002 | Chinn | G06F 16/957 |
| | | | 715/236 |
| 2002/0077085 A1* | 6/2002 | Kalish | H04M 1/72445 |
| | | | 455/414.3 |
| 2002/0091725 A1 | 7/2002 | Skok | |
| 2002/0184359 A1* | 12/2002 | Kaneko | G06F 16/958 |
| | | | 707/E17.116 |
| 2003/0051059 A1 | 3/2003 | Zondervan et al. | |
| 2003/0182208 A1* | 9/2003 | Dupuis | G06Q 30/02 |
| | | | 705/26.1 |
| 2004/0010508 A1* | 1/2004 | Fest | G06F 16/958 |
| | | | 707/999.102 |
| 2005/0160065 A1* | 7/2005 | Seeman | G06F 16/957 |
| 2005/0262095 A1 | 11/2005 | Beartusk et al. | |
| 2006/0190806 A1 | 8/2006 | Sasson et al. | |
| 2006/0212434 A1 | 9/2006 | Crawford et al. | |
| 2007/0206221 A1* | 9/2007 | Wyler | H04L 67/01 |
| | | | 358/1.15 |
| 2007/0299986 A1* | 12/2007 | Craig | H04L 61/30 |
| | | | 707/E17.116 |
| 2008/0052668 A1* | 2/2008 | Craig | G06F 16/958 |
| | | | 717/111 |
| 2008/0306937 A1* | 12/2008 | Whilte | G06F 16/957 |
| | | | 707/999.005 |
| 2008/0313260 A1* | 12/2008 | Sweet | G06F 16/958 |
| | | | 709/201 |
| 2009/0177644 A1 | 7/2009 | Martinez et al. | |
| 2010/0162129 A1* | 6/2010 | Morris | G06F 16/955 |
| | | | 715/745 |
| 2012/0047427 A1 | 2/2012 | Hauser | |
| 2012/0317657 A1 | 12/2012 | Glimcher et al. | |
| 2013/0031470 A1 | 1/2013 | Daly, Jr. et al. | |
| 2013/0145273 A1 | 6/2013 | Hymel et al. | |
| 2014/0068407 A1 | 3/2014 | Suh et al. | |
| 2014/0089219 A1* | 3/2014 | Mathews | G06Q 10/10 |
| | | | 705/327 |
| 2014/0129535 A1* | 5/2014 | Riley | G06F 16/248 |
| | | | 707/706 |
| 2014/0289598 A1* | 9/2014 | Charitos | G06F 16/954 |
| | | | 715/205 |
| 2015/0105878 A1 | 4/2015 | Jones et al. | |
| 2015/0143251 A1 | 5/2015 | Bailiang et al. | |
| 2016/0063016 A1* | 3/2016 | Eggleston | G06F 16/958 |
| | | | 707/706 |
| 2016/0253079 A1 | 9/2016 | Hasija et al. | |
| 2017/0193122 A1* | 7/2017 | Wright | G06F 16/958 |
| 2017/0235709 A1* | 8/2017 | Jennings | G06F 40/197 |
| | | | 715/229 |
| 2018/0039530 A1 | 2/2018 | Ciabarra, Jr. et al. | |
| 2018/0357215 A1* | 12/2018 | Austin | G06F 16/9535 |
| 2018/0365335 A1 | 12/2018 | Savinskiy et al. | |
| 2019/0019426 A1 | 1/2019 | Chambers | |
| 2019/0026082 A1* | 1/2019 | Shalev | G06F 3/0486 |
| 2020/0142544 A1 | 5/2020 | Fleck et al. | |
| 2020/0159790 A1 | 5/2020 | Barbosa et al. | |
| 2020/0319995 A1* | 10/2020 | Mitra | G06F 16/958 |
| 2020/0401646 A1* | 12/2020 | Brunet | G06F 16/9574 |
| 2020/0401656 A1* | 12/2020 | Gajulu Narasimhalu | G06F 40/134 |
| 2020/0408554 A1 | 12/2020 | Jaatinen et al. | |

* cited by examiner

| Code 501 | Page Type 502 | Identifier 503 |
|---|---|---|
| 0x38 | Shopping Cart | URL_1 |
| 0x43 | Comedy Movies | URL_2 |
| 0x19 | Playoff Bracket | URL_3 |
| 0x58 | Bill Pay | URL_4 |
| 0x67 | Credit Cards | URL_5 |
| 0x71 | Checking & Savings | URL_6 |
| 0x75 | Home Page | URL_7 |
| 0x76 | Login | URL_8 |

FIG. 6

CUSTOMIZED NAVIGATION FLOW

CROSS REFERENCE TO RELATED APPLICATION

This application is a continuation of and claims priority to U.S. patent application Ser. No. 17/089,029, titled "CUSTOMIZED NAVIGATION FLOW," filed Nov. 4, 2020, the disclosure of which is hereby incorporated by reference in its entirety.

FIELD OF USE

Aspects of the disclosure relate generally to managing software and more specifically to managing navigation of websites or other software applications.

BACKGROUND

Websites and/or applications may have navigation experiences that are static and/or hard coded. Each time a user accesses a website and/or application, the user may be presented with the same set of pages and/or screens in the same order. The user may need to navigate through multiple pages and/or screens to access a page and/or screen that they were seeking. The static and/or hard coded navigation experiences may be time-consuming and may lead to a poor experience for the user. Additionally, due to the static and/or hard coded nature of the navigation experiences, modifying the software code that contains the navigation experiences can also be tedious and time-consuming for the software engineer.

Aspects described herein may address these and other problems, and generally improve user interactions with websites and/or applications by generating dynamic navigation experiences.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Navigation flows (e.g., the pages, user interfaces, views, etc. that are displayed to a user) may be customized for each user. Navigation parameters may be generated for a user and may indicate a customized navigation flow for the user. The navigation parameters may indicate one or more pages of a website/application and an order that each of the one or more pages should be displayed to the user. The navigation parameters may indicate a trigger for each page. A trigger may indicate an action and/or event that causes a change in display to the next page in the navigation flow. Navigation parameters may be shared between devices, which may enable the user to experience the same navigation flow across multiple websites/applications.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for customizing a navigation flow of an application or a website. As noted, above, websites and/or applications may have navigation experiences that are static. Accordingly, a user may be presented with the same set of pages and/or screens in the same order each time the user accesses a website and/or application. In this regard, the user may need to click through a series of pages and/or screens to obtain the page and/or screen that they were looking for. Additionally, current coding techniques prevent generating dynamic flows since developers may have to code each link manually.

Systems as described herein may enable customization of navigation flows, for example, based on user preferences and/or the user's browsing habits. Navigation flows (e.g., the pages, user interfaces, views, etc. that are displayed to a user) may be customized for each user. To generate the customized navigation flows, navigation parameters may be generated for a user. The navigation parameters may be based on a user's preferences and/or browsing habits and may indicate the user's preferred navigation flow. For example, the navigation parameters may indicate one or more pages of a website and/or application that a user visits frequently and/or spends a significant amount of time browsing. Additionally, the navigation parameters may define an order that each of the one or more pages should be displayed to the user, for example, based on the order with which the user navigates the website and/or application. In some instance, the navigation parameters may define a trigger for each page. The trigger may indicate an action and/or event that causes a change in display to the next page in the navigation flow. According to some examples, the navigation parameters may be ported (e.g., shared) between devices (e.g., through the use of codes that assist in identifying pages in one website/application that are similar to another website/application), which may enable the user to experience the same navigation flow across multiple, industry-related websites and/or applications.

Generating a navigation flow according to navigation parameters may improve user experience because it allows the navigation flow to be customized for each user. The navigation parameters may be adjusted by a device based on how the user interacts with one or more pages of a website/application. This may enable the user to experience a navigation flow that is optimized for the user's needs. It may also eliminate the need for static and/or hardcoded websites/applications and may reduce the work needed (e.g., from software engineers) to modify navigation flows of websites/applications. Codes for sharing the navigation parameters provide a technological solution to enable the user's customized flow to follow them as they use different websites/applications, for example, in the same industry (e.g., banking, online retail, video streaming, etc.).

Figure 1:
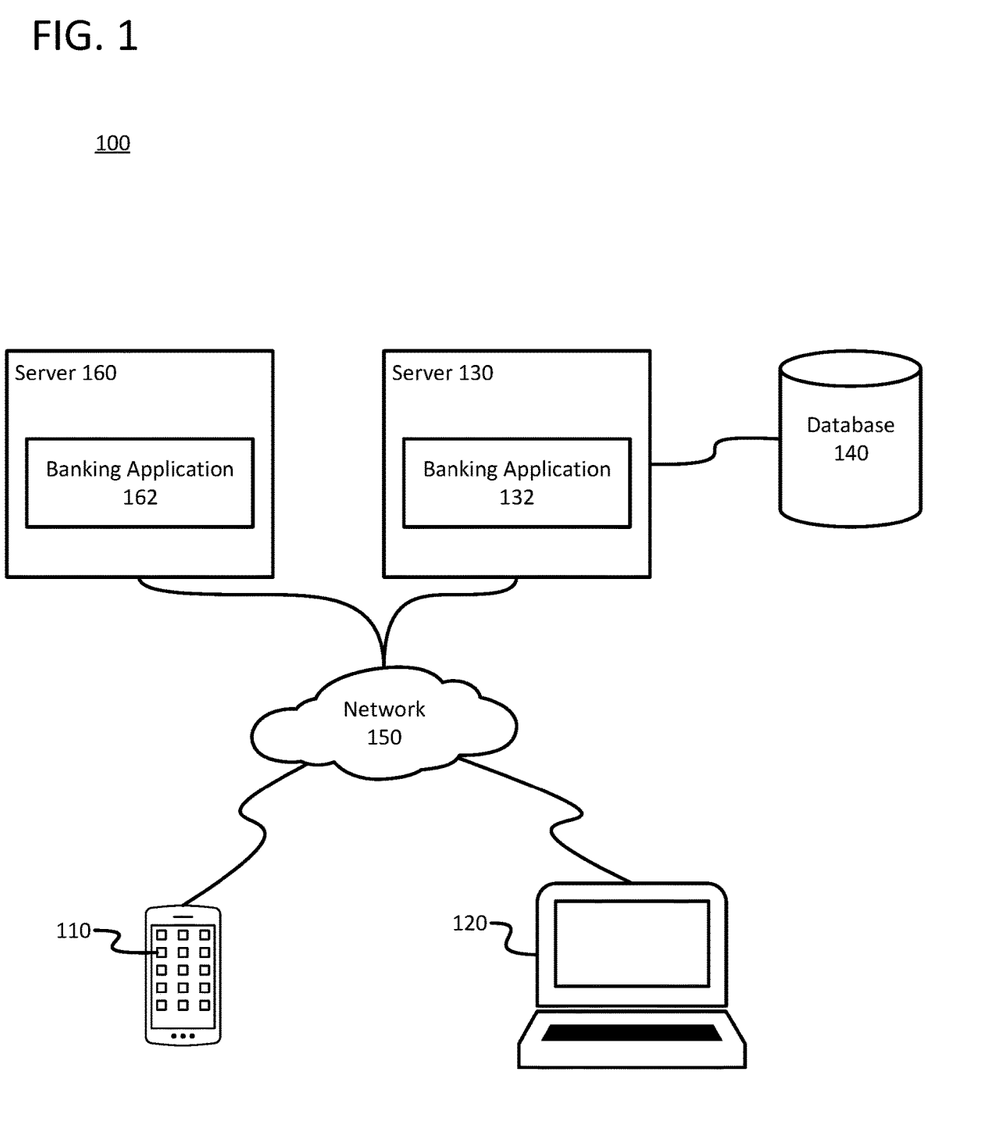
FIG. 1 shows an example of a control processing system in which one or more aspects described herein may be implemented.

Turning to FIG. 1, a system 100 is shown that includes a first user device 110, a second user device 120, and a server 130, connected to a first database 140, interconnected via network 150. The system may include one or more additional servers (e.g., a server 160).

First user device 110 may be a mobile device, such as a cellular phone, a mobile phone, a smart phone, a tablet, or a laptop. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a banking application that provides access to the first user's banking information, as well as perform routine banking functions, such as checking the first user's balance, paying bills, transferring money between accounts, withdrawing money from an automated teller machine (ATM), wire transfers, etc. In other embodiments, the one or more applications may be a digital, or electronic, wallet that is part of a payment service.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. These websites may include banking websites that allow the user to access his/her banking information and perform routine banking functions. In some embodiments, second user device 120 may include a banking application that allows the user to access his/her banking information and perform routine banking functions.

Server 130 may be any server capable of executing banking application 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Banking application 132 may be server-based software configured to provide users with access to their account information and perform routine banking functions. In some embodiments, banking application 132 may be the server-based software that corresponds to the client-based software executing on first user device 110 and second user device 120. Additionally, or alternatively, banking application 132 may provide users access to their account information through a website accessed by first user device 110 or second user device 120 via network 150. While application 132 has been described in the context of a banking application, it will be appreciated that application 132 may be any application capable of facilitating an electronic transaction between a first party and a second party. For example, application 132 may be a wire transfer service, a payment service (e.g., Venmo®), an escrow service, or the like. Aspects described herein may enable a user to customize a navigation flow for the banking application (e.g., for facilitating the electronic transaction between the first party and the second party) and/or a digital, or electronic, wallet. Similarly, the electronic transaction may include wire transfers, as well as bill pay, escrow transactions, cryptocurrency transfers, cryptocurrency exchanges, money transfers, and the like. In this regard, server 130 and banking application 132 may be a trusted third party to facilitate the transfer of assets and, if necessary, hold the assets in escrow. Assets may include money, cryptocurrency, stocks, options, bonds, mutual funds, ETFs, or anything with an economic value.

First database 140 may be configured to store information on behalf of application 132. The information may include, but is not limited to, personal information, account information, and user-preferences. Personal information may include a user's name, address, phone number (e.g., mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. First database 140 may include, but are not limited to relational databases, hierarchical databases, distributed databases, in-memory databases, flat file databases, XML databases, NoSQL databases, graph databases, and/or a combination thereof. The server 160 may comprise any of the components and/or be configured to perform any of the functions described above in connection with the server 130. The banking application 162 may be configured to perform any of the functions described above in connection with the banking application 132. Server 160 may be managed by the same entity as server 130. Additionally or alternatively, server 160 and/or banking application 162 may be managed by a different entity than server 130.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
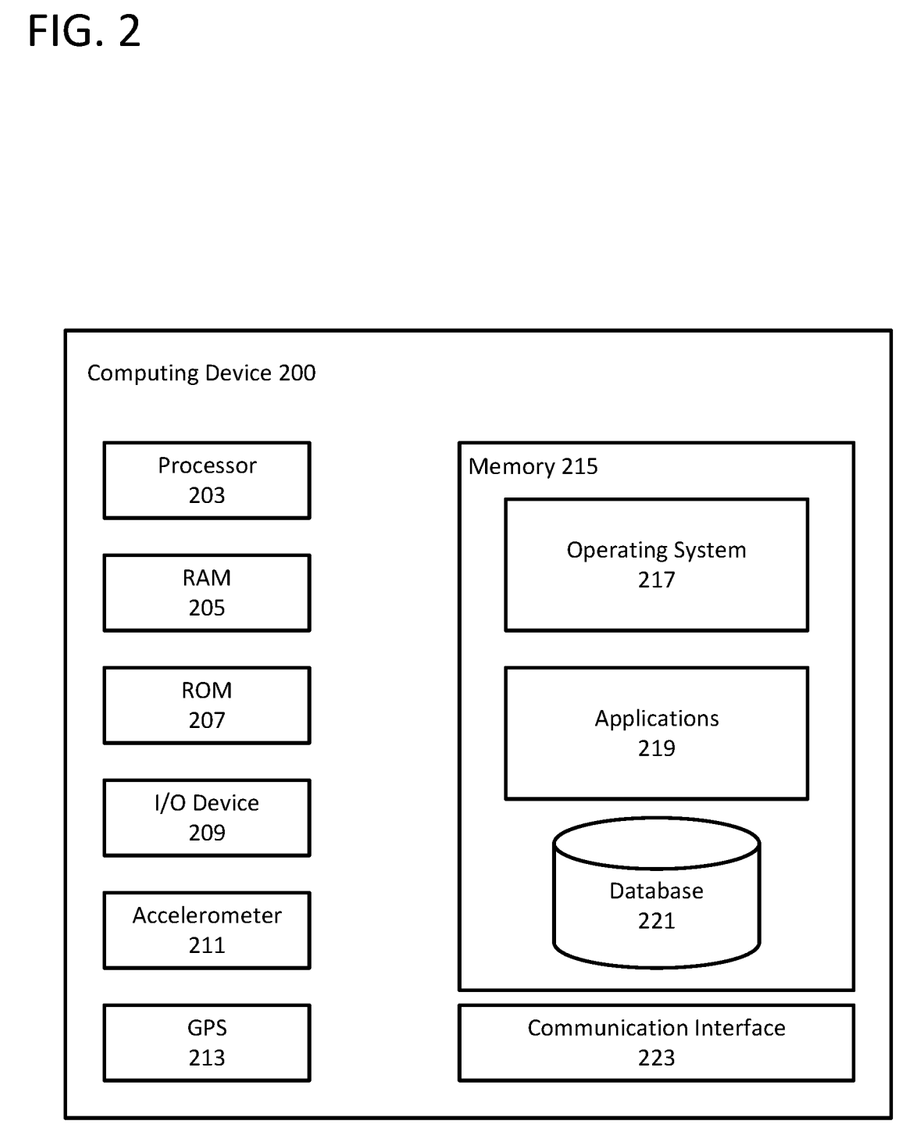
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication with each other.

Figure 3:
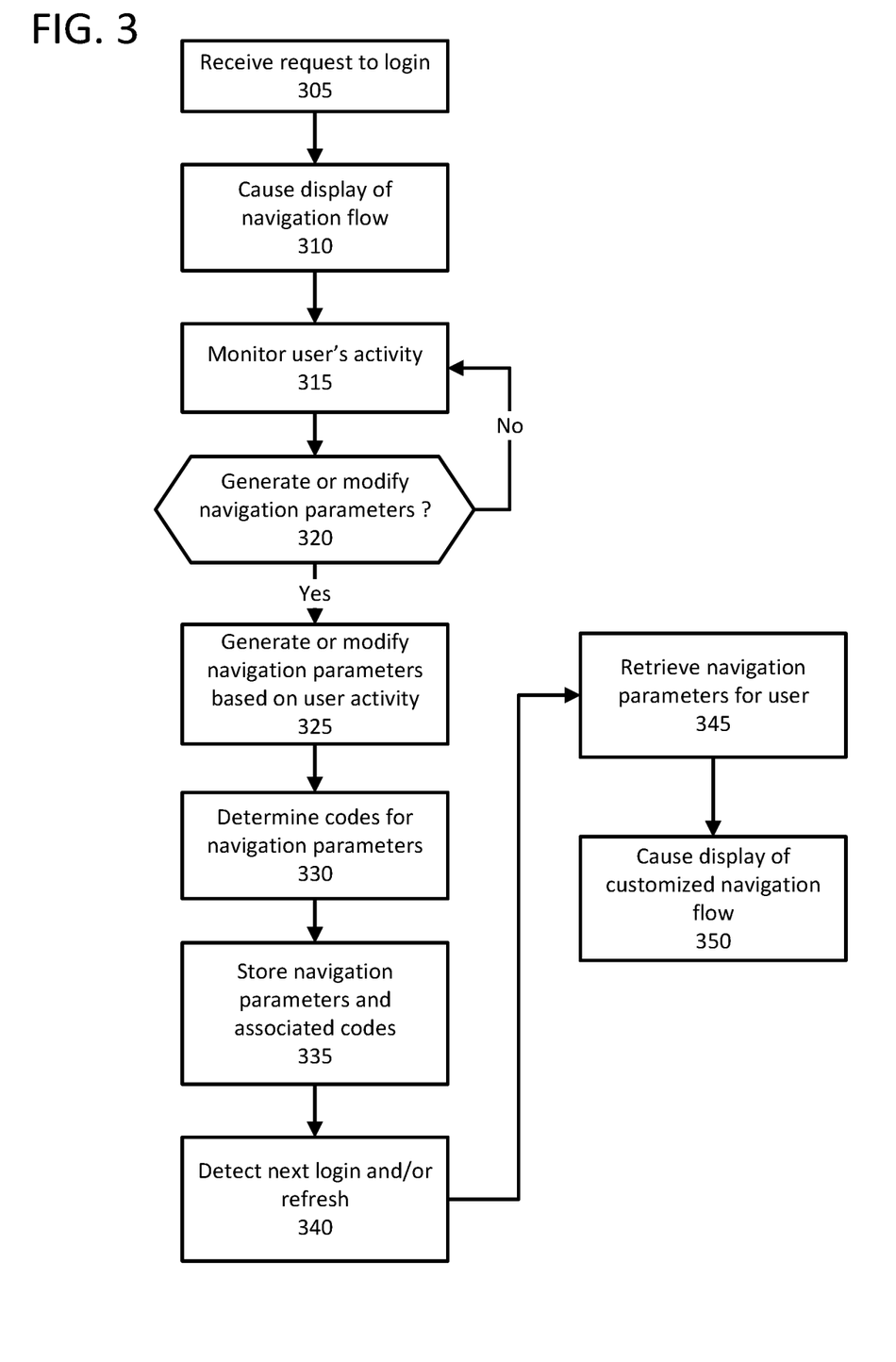
FIG. 3 shows a flow chart of an example process for customizing navigation flows according to one or more aspects of the disclosure.

A server, or a service offered by a server, may allow a user to customize their use of a website or other software application (e.g., browsing experience), for example, based on user preferences and/or the user's browsing habits. FIG. 3 shows an example method for customizing a navigation flow associated with use of a website/application (e.g., a browsing experience). The example method may be performed using any device or component described in connection with FIGS. 1-2. Although one or more steps of FIG. 3 are described for convenience as being performed by the server 130 and/or the first user device 110, one, some, or all of such steps may be performed by the second user device 120, the computing device 200, or one or more other computing devices, and steps may be distributed among one or more computing devices, including any computing devices such as those described in connection with FIGS. 1-2. One or more steps of FIG. 3 may be rearranged, modified, repeated, and/or omitted.

At step 305, the server 130 may receive a request to login from the first user device 110. The request to login may include one or more credentials of a user. For example, a user of the first user device 110 may input a username and password at the first user device 110. The request to login may comprise one or more biometric samples (e.g., facial image, fingerprint scan, voiceprint, etc.), one or more one-time passwords, one or more tokens, or any other information suitable for authentication. The first user device 110 may send the username and password for authentication by the server 130. In response to receiving the one or more credentials, the server (e.g., server 130) may verify the one or more credentials provided by the user. When the one or more credentials are invalid, server 130 may deny the login request. However, when the one or more credentials are valid (e.g., match previously stored credentials), the method may authenticate the first user device and proceed to step 307.

At step 310, the server 130 may cause display a first navigation flow to be displayed on the first user device 110. A navigation flow may comprise one or more pages (e.g., web pages, user interfaces, views (e.g., of a software application), or other computer-generated output) presented (e.g., outputted, displayed) in a particular order. A navigation flow may comprise a path (e.g., a series of pages) that a user encounters as the user performs one or more actions. For example, a navigation flow for purchasing a product may comprise a first page that shows the product, a second page that enables the user to enter information (e.g., payment, shipping, or other information), and a third page that indicates confirmation of the purchase. A navigation flow may comprise one or more pages for any type of action a user may perform using a computing device (e.g., the first user device 110). For example, a navigation flow may include one or more user interfaces for online shopping, social media, banking, news, sports, surveys, etc. A navigation flow may comprise a series of pages for filling out a report. A navigation flow may comprise the order that questions are displayed in a survey. The navigation flow displayed in step 307 may comprise a default navigation flow. For example, the server 130 may cause display of a default landing page of a website. The default navigation flow may be shown to the user, for example, if the user is not associated with a customized navigation flow.

At step 315, the first user device 110 and/or the server 130 may monitor the user's activity and/or interactions with the navigation flow displayed in step 310. The user's activity may be monitored to assist in determining a customized navigation flow for the user. The first user device 110 and/or the server 130 may monitor what pages are accessed and/or the actions (e.g., clicks, keyboard entries, or other input) the user makes on each page (e.g., how the user interacts with each page). For example, the first user device 110 and/or the server 130 may monitor how much time the user spends on each page. The server 130 may track each page that is requested by the first user device 110. For example, the server 130 may store a record indicating what pages were requested by the first user device, the order in which the pages were requested or viewed, and/or the time that the pages were requested. The first user device 110 may send, to the server 130, metrics for each page indicating the actions taken by the user on each page. The metrics may comprise a quantity of time the user spent on a page, user interactions with each page, the quantity of actions taken on each page, the order each page was accessed, how much time was spent on each page, etc. The first user device 110 and/or server 130 may monitor how the user transitions away from each page.

At step 320, the server 130 may determine whether to generate and/or modify navigation parameters (e.g., based on the activity monitored in step 315). Navigation parameters may be used to determine a navigation flow. Navigation parameters may indicate one or more pages of a navigation flow. Navigation parameters may indicate an order in which the one or more pages should be displayed. Navigation parameters may indicate an affiliation with an industry. The affiliation may enable two or more devices to share navigation parameters. For example, a first device in the banking industry may determine that navigation parameters indicating an affiliation with the banking industry may be shared with a second device in the banking industry. Navigation parameters may comprise a data structure (e.g., a list, a map, array, etc.) indicating an order for a plurality of pages. Each item (e.g., class, object, etc.) in the data structure may correspond to a page. For example, each item in the data structure may comprise an identifier (e.g., a link, a uniform resource locator, a file path, etc.) of a page. The identifier may enable the server 130 to determine which page to send to the first user device 110 at each transition in a navigation flow. Additionally or alternatively, each item in the data structure may comprise a trigger. A trigger may indicate an action and/or an event that may cause the next page in the navigation flow to be displayed. For example, a trigger may comprise clicking or tapping a user interface element (e.g., a button, a menu item, or any other element), scrolling past a point in a page, loading a page, downloading a document or any other action/event.

Figure 5:
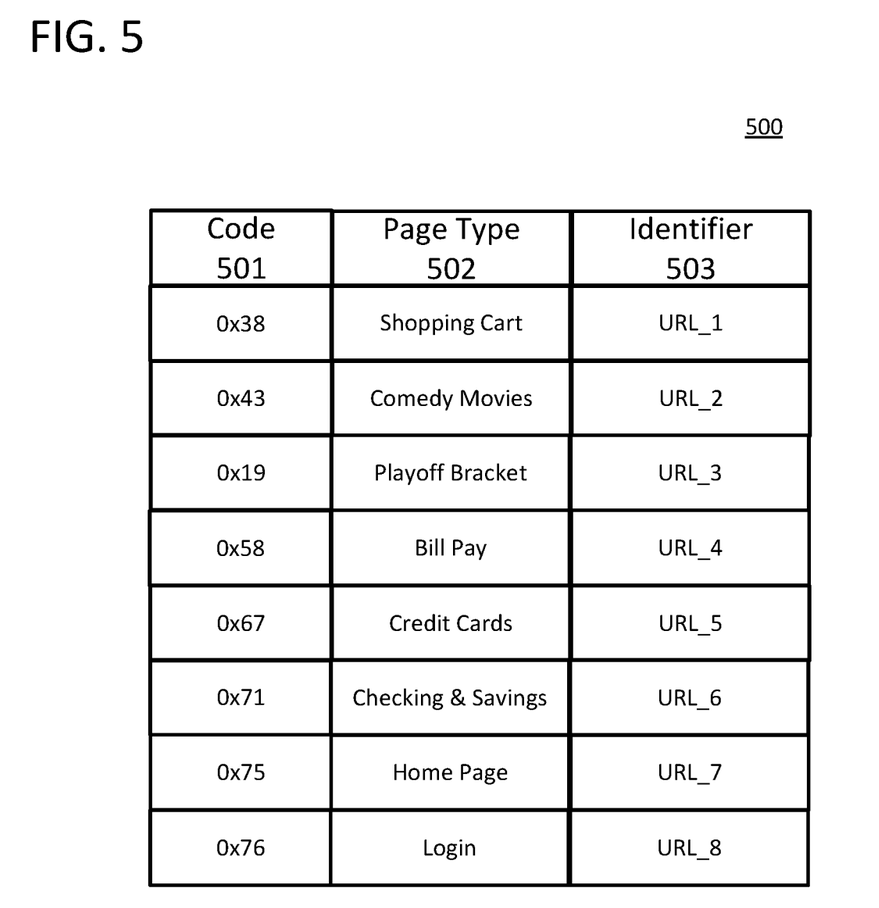
FIG. 5 shows example codes for sharing navigation flows according to one or more aspects of the disclosure.

Additionally or alternatively, each item in the data structure may comprise a code that represents a corresponding page or page type. For example, as shown in FIG. 5, 0x38 may represent a page that comprises a shopping cart for online shopping. A code may enable the server 130 to share navigation parameters with a second server. The second server may use the code to determine a page associated with a website/application of the second server. This may enable a user's preferred navigation flow to persist across multiple websites/applications (e.g., multiple applications of the same type, multiple banking applications, etc.). Codes corresponding to pages or page types are explained in further detail below in connection with FIG. 5. The navigation parameters may be stored in database 140 and may be linked to a user (e.g., the user discussed in connection with step 305).

The server 130 may determine to generate and/or modify navigation parameters, for example, if input from the user indicates that navigation parameters should be generated/modified. For example, a user may indicate (e.g., via input entered through the first user device 110) one or more pages and an order of the one or more pages (e.g., as discussed in more detail below in connection with FIGS. 4A-4C). Additionally, the user may indicate a trigger (e.g., for each page) that causes the next page in the navigation flow to be displayed.

The server 130 may determine to generate/modify navigation parameters, for example, if a quantity of interactions a user has with a page satisfies a threshold. As described above in connection with step 315, the first user device 110 may record interactions (e.g., clicks on a mouse, keyboard key pushes, etc.) with one or more pages and may send information indicating the interactions and/or the quantity of interactions to the server 130. The server may determine that a page should be added to the navigation parameters, for example, if a quantity (e.g., 2, 3, 10, etc.) of interactions with the page satisfy a threshold. The server 130 may remove a page from the navigation parameters, for example, if the quantity of interactions with the page fails to satisfy the threshold.

The server 130 may determine to generate and/or modify the navigation parameters, for example, based on a quantity of time a user spends viewing a page. For example, the first user device 110 may record the quantity of time a user spends on a page and may send information comprising the quantity of time and the associated page to the server 130. The server 130 may determine that the navigation parameters may be generated/modified, for example, if the quantity of time (e.g., 2 minutes, 5 minutes, etc.) spent on a page satisfies a threshold. For example, the server 130 may add a page to the navigation parameters if the quantity of time spent on the page satisfies the threshold. The server 130 may remove a page from the navigation parameters, for example, if the quantity of time spent on a page fails to satisfy a threshold.

The server 130 may determine whether to generate/modify navigation parameters, for example, in response to a user request to generate a custom navigation flow. For example the server 130 may receive one or more user inputs regarding a user's navigation flow preferences (e.g., the inputs may indicate what pages to include in the navigation flow, the order of the pages, the triggers for changing between pages, etc.). Additionally or alternatively, the server 130 may determine to generate/modify navigation parameters to improve user experience by generating the custom navigation flow (e.g., if the user is not associated with navigation parameters or the user's interactions with one or more pages differ from the user's navigation parameters), for example, based on the user's browsing habits. If the server 130 determines that navigation parameters do not need to be generated/modified, step 315 may be repeated. Otherwise, the method may proceed to step 325.

At step 325, the server 130 may generate and/or modify navigation parameters based on the user's activity monitored in step 315. The server 130 may generate a data structure comprising the navigation parameters, for example, if there are no navigation parameters associated with the user. The server 130 may modify the data structure, for example, if navigation parameters already exist for the user. The server 130 may modify the navigation parameters based on input received from the first user device 110. The user may send input via the first user device 110 indicating a modification of the navigation parameters. The input may indicate a change in the order of the pages to be displayed in the navigation flow. The input may indicate a page to add to the navigation flow and/or a page to be removed from the navigation flow.

The server 130 may modify the navigation parameters based on a quantity of time and/or quantity of interactions associated with the user's activity on each page. Additionally or alternatively, the server 130 may determine a trigger for each page indicated by the navigation parameters. For example, the trigger may comprise an action performed by a user before the user causes a transition to another page. For example, the trigger may comprise an interaction with a submit button, a link, a scroll, or any other action performed by the user. For example, if a user submits a bill payment, and then clicks a link to return to an account summary, the server 130 may determine that the bill pay page should be the first page in the navigation parameters and the account summary page should be the second page in the navigation parameters. The server 130 may determine that the trigger (e.g., for switching from the bill pay page to the account summary page) should be the user's interaction with a submit button on the bill pay page.

The navigation parameters may be used by the server 130 to generate a customized landing page for the associated user. The customized landing page may be a page that comprises user interface elements (e.g., buttons, links, etc.) corresponding to each page indicated by the data structure. For example, the server 130 may generate a customized landing page for a user of the banking application 132. The navigation parameters may indicate that the user most frequently uses a checking & savings page and a credit cards page. For example, the server may determine that the pages where the user spends more than a threshold amount of time (e.g., 5 minutes, 10 minutes, etc.) are the checking & savings page and the credit cards page. For example, the server may determine that the only pages where the user performs more than a threshold quantity of interactions (e.g., 3 clicks and/or 10 keyboard inputs, etc.) are the checking & savings page and the credit cards page. Based on the determination, the server may generate a customized landing page comprising user interface elements corresponding to the checking & savings page and/or the credit cards page.

At step 330, the server 130 may determine codes for the navigation parameters generated in step 325. The codes may allow the navigation parameters to be shared with other computing devices (e.g., servers) and/or services so a user's preferred navigation flow may be maintained across multiple applications, websites, and/or other software. The codes may allow a computing device to determine a page of a first service that corresponds to a similar page of a second service. For example, a first bank may provide a first banking website. A first server of the first bank may generate navigation parameters for a user of the first banking website. The navigation parameters may indicate that the user prefers to start with a bill pay page after logging in. The first server may generate codes for the navigation parameters and may send the codes and/or navigation parameters to a second server (e.g., associated with a second bank) that offers a second banking website (e.g., the user may have an account associated with both the first banking website and the second banking website). The second server may use the codes to follow a navigation flow that is used by the first server. For example, the second server may determine, based on the codes, that a bill pay page associated with a website/application of the second server should be displayed first in a navigation flow for the user. The server 130 may determine codes for navigation parameters (e.g., for each page indicated by the navigation parameters) based on a table (e.g., the example table shown in FIG. 5 and discussed in more detail below) that indicates codes for each page indicated by the navigation parameters.

At step 335, the server 130 may store the navigation parameters (e.g., generated in step 325) and/or the associated codes determined in step 335 in memory, such as database 140. At step 340, the server 130 may detect the next login of the user that initiated the login in step 305. For example, the server 130 may receive an additional request to login from the first user device 110. Alternatively, the server 130 may detect that the user has refreshed the page (e.g., a page of a website, a page of an application, etc.).

At step 345, the server 130 may retrieve navigation parameters, for example, based on the login and/or refresh detected in step 340. The server 130 may retrieve the navigation parameters from the database 140 using the login information (e.g., username) and/or other user identifiers to perform a query on the database 140. The server 130 may use the navigation parameters to determine a page for output after successful authentication (e.g., log in) of the user and/or after the user refreshes the page. For example, the first page shown to a user after successful login may be the first page indicated in the navigation parameters. Alternatively, server 130 may generate a customized webpage that rearranges the links based on the navigation parameters associated with a user. For example, a link for a first page that the user access frequently may be displayed prominently (e.g., at the top) of a landing page.

At step 350, the server 130 may cause display of a navigation flow that is customized for the user. After sending the first page in the navigation flow (e.g., as indicated by the navigation parameters), the server 130 may detect the trigger corresponding to the first page. After detecting the trigger, the server 130 may send the second page in the navigation flow. This process may continue until each page in the navigation flow has been displayed to the user. For example, the first server 130 may iterate over a data structure comprising the navigation parameters. The first server 130 may determine an identifier or location for each page indicated in the data structure. The first server 130 may retrieve (e.g., from the database 140), based on the identifier or location, each page indicated by the navigation parameters and may send each page to the first user device 110. According to aspects described herein, the server 130 may be able to provide a service that allows users to generate a customized navigation flow based on the user's indicated preferences and/or actual browsing preferences. This provides a better user experience because it allows a user to navigate to the pages that the user is interested in using more quickly (e.g., with less clicks, taps, or other user input). It also may provide a better user experience because the user may not need to remember the locations of links or other user interface elements (e.g., the triggers allow the navigation flow to progress to the next page of interest for the user). Additionally or alternatively, the portability of the navigation parameters provides a technological solution to enable the user's customized flow to follow them as they navigate across different websites/applications in the same industry (e.g., banking, online retail, etc.).

Figure 4A:
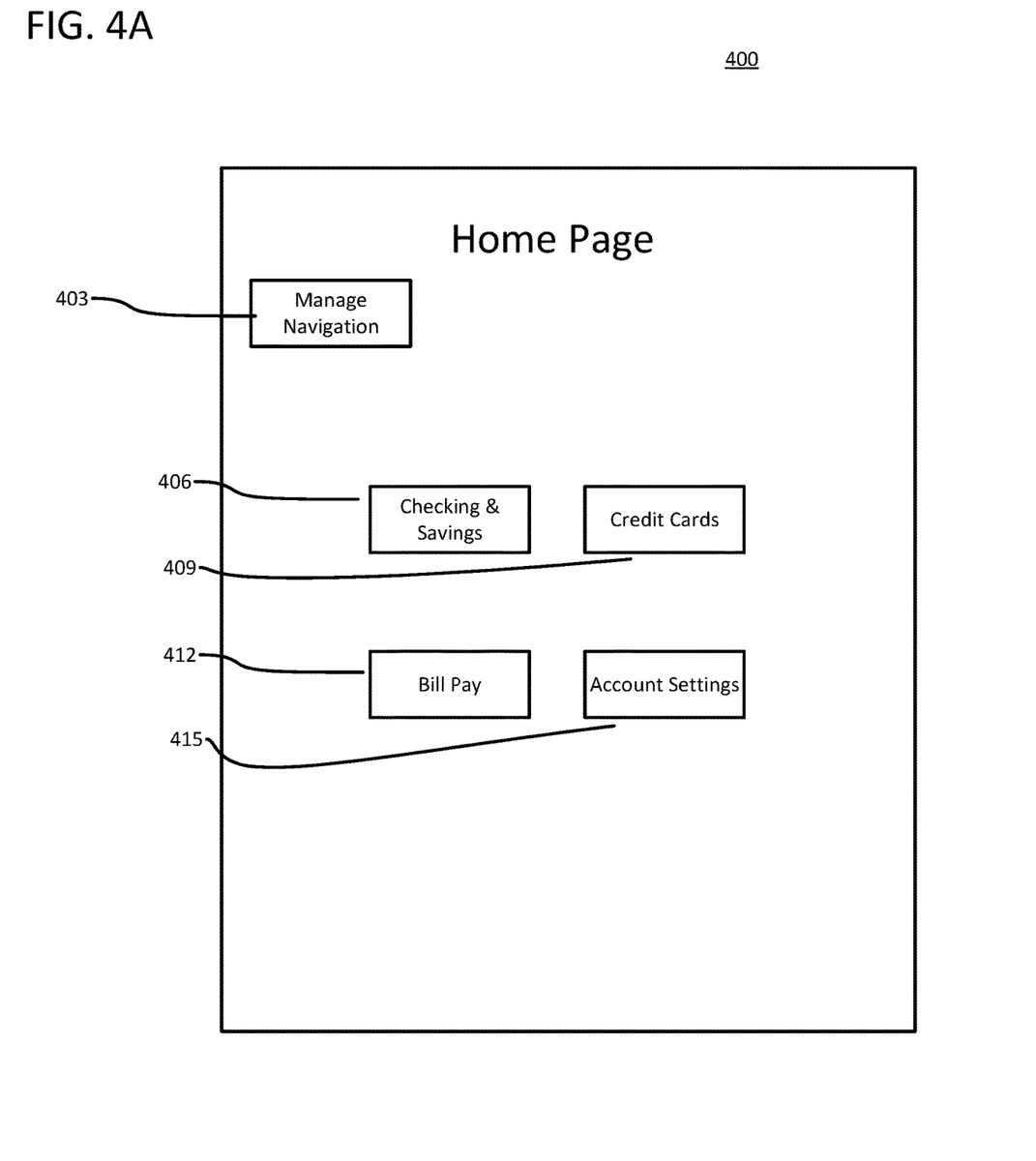
FIGS. 4A-4C show example user interfaces for customizing navigation flow according to one or more aspects of the disclosure.
Figure 4B:
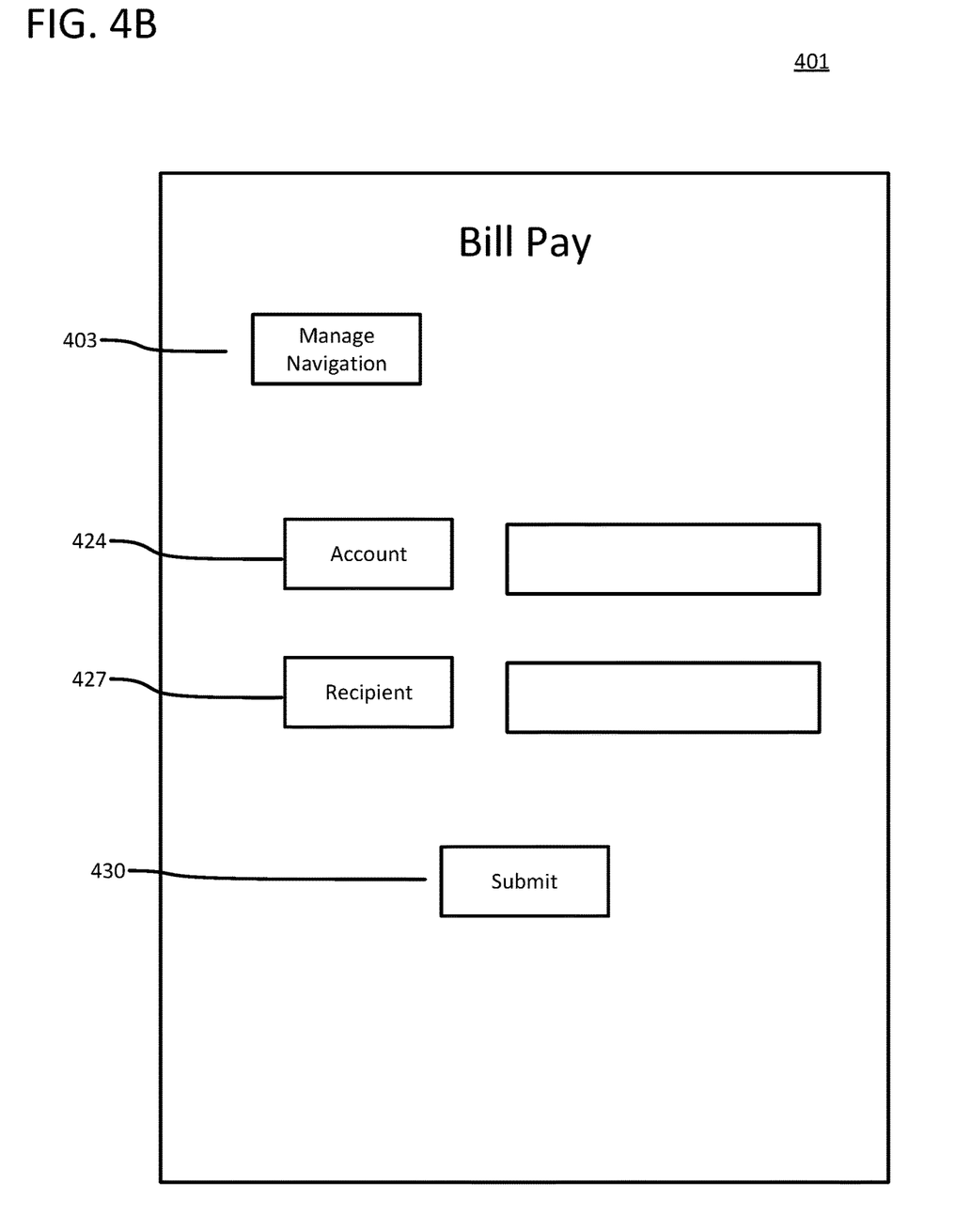
Figure 4C:
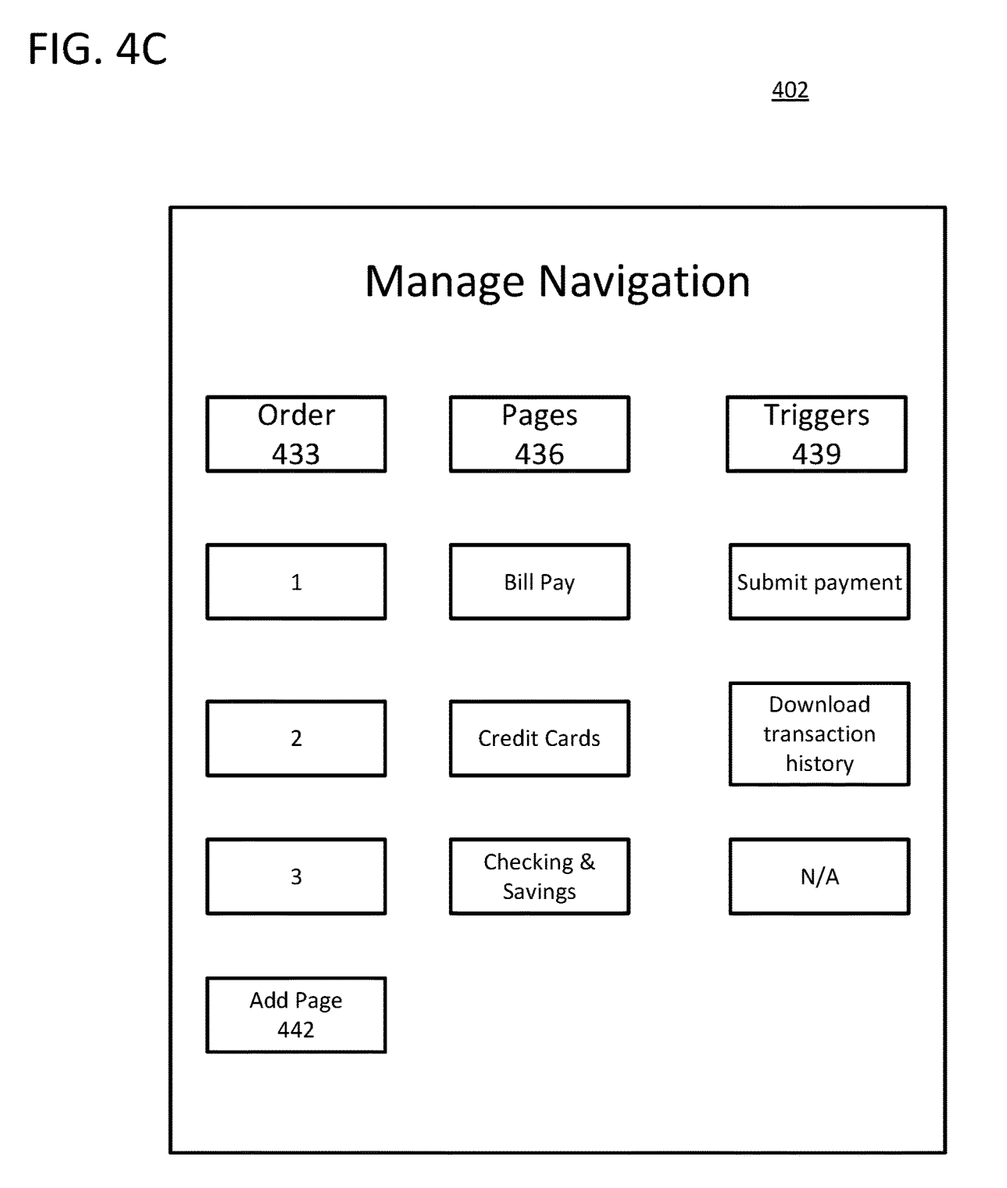

FIGS. 4A-4C show example pages for which navigation flow may be customized Although a banking website/application is shown in FIGS. 4A-4C, aspects described herein may be used in any type of website or software application. FIG. 4A shows an example home page 400 for a banking website or application. The home page 400 may comprise links to enable a user access to other pages where the user can perform various banking functions. For example, the home page 400 may comprise a checking & savings link 406, a credit cards link 409, a bill pay link 412, and/or an account settings link 415. The home page may comprise a manage navigation link 403, which may allow a user to modify one or more navigation flows for the banking website/application (e.g., as discussed in more detail in connection with FIG. 4C below).

FIG. 4B shows an example bill pay page 401. The bill pay page 401 may comprise an account field 424 (e.g., for specifying an account from which money should be used in a payment), a recipient field 427 (e.g., specifying an account to which money should be payed), and/or a submit button 430 for finalizing a payment. The bill pay page 401 may comprise the manage navigation link 403. Based on an interaction with the manage navigation link 403, a user device (e.g., the first user device 110, the second user device 120, etc.) may display a user interface for managing navigation flow (e.g., as shown in FIG. 4C).

FIG. 4C shows an example user interface (UI) 402 for managing a navigation flow. The UI 402 may comprise a table with columns showing the order 433 of one or more pages. The table may indicate the pages 436 in the navigation flow and triggers 439 that cause display of the next page in the navigation flow.

According to the example navigation flow shown in FIG. 4C, the server 130 may cause display of the bill pay page 401 (e.g., by sending the bill pay page to the first user device 110). After the user submits a payment, the server 130 may cause display of a credit cards page. After the user has downloaded the credit card transaction history, the server 130 may cause display of a checking & savings page.

The UI 402 may comprise an add page element 442 that may enable to user to add one or more pages to the navigation flow. For example, the user may add the account settings page corresponding to the account settings link 415 to the navigation flow. The UI 402 may allow the user to change the order of one or more pages in the navigation flow (e.g., by dragging a row in the table) and/or remove one or more pages from the navigation flow.

Codes may be used to share navigation flows between two or more devices. For example, a navigation flow for a first banking application may be shared so that the associated user can use the same navigation flow for a second banking application. FIG. 5 shows example codes for sharing navigation flows between devices. Codes may be used to represent types of pages and may enable sharing of navigation flows between similar websites/applications. For example, a first bank may share codes for a navigation flow of a user with a second bank so the user's navigation flow may be used with a website/application of the second bank. Navigation flows may be shared between many different types of websites/applications. For example, navigation flows may be shared between different social media applications, between different email applications, between different health care applications, between different video streaming applications, between different online retailers, etc. A code may be assigned to each type of page.

The server may use a table 500 (e.g., stored in the database 140) to determine a code for a page. The table 500 may comprise a code column 501 that stores codes for each page. The table 500 may comprise a page type column 502 that stores a description of the page type. For example, page types may comprise a shopping cart page type for online shopping applications, media genre page type (e.g., comedy, fantasy, horror, action, etc.) for video streaming applications, a home page type, a playoff bracket page type for sports or electronic sports applications, etc. For example the code 0x43 may correspond to a page for comedy movies of a video streaming application. A navigation flow may indicate that after logging in and/or authenticating a user, the comedy movie page should be displayed first. The server 130 may convert the navigation parameters into codes that can be shared with a second server to provide navigation data for a second video streaming application. If the user logs into the second video streaming application, the second video streaming application may follow the navigation flow that is followed by the server 130 display a page for comedy movies first in the navigation flow. The table may comprise an identifier column 503 that stores a uniform resource locator (URL), file path, and/or other location information for each page. The information stored in the identifier column 503 may be used by the server 130 to determine the location of the page and/or retrieve the page from the database 140. Page codes may enable the navigation parameters to be portable and may provide a way for different websites/applications to map their pages to the user's preferred navigation (e.g., browsing, usage, etc.) experience. The portability of the navigation parameters may provide a technological solution to enable the user's customized flow to follow them as they navigate across different websites/applications, for example, in the same industry (e.g., banking, online retail, etc.

Figure 6:
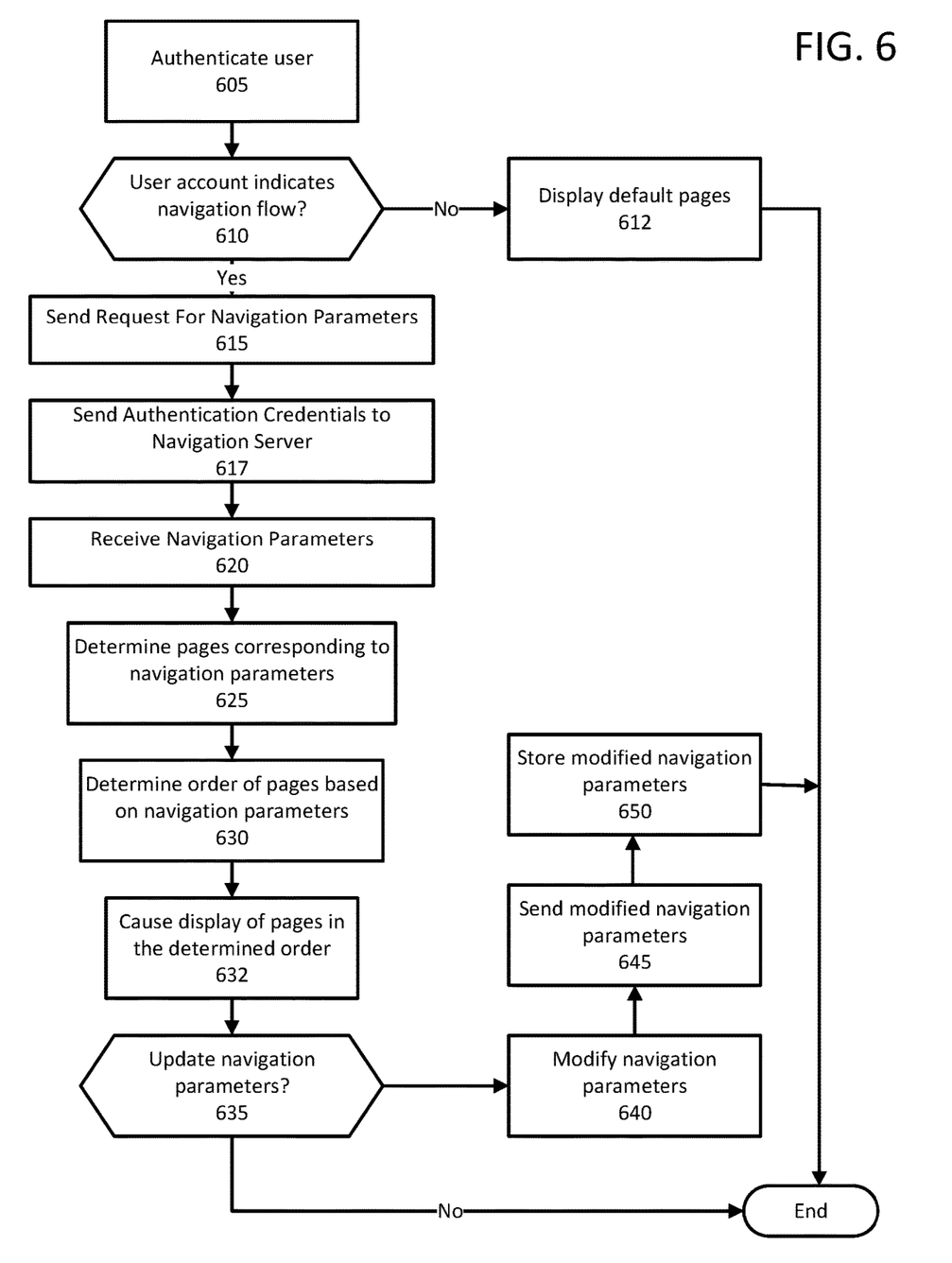
FIG. 6 shows a flow chart of an example process for sharing a customized navigation flow according to one or more aspects of the disclosure.

As noted above, one of the benefits realized by the service that generates the navigation parameters is that the data may be shared or ported to other platforms. Accordingly, the user's customized browsing preferences may follow the user through one or more sites that the user visits. FIG. 6 shows an example method for sharing (e.g., porting) a customized navigation flow. A first device (e.g., the server 160, or any other device described in connection with FIGS. 1-2) may receive navigation parameters for a navigation flow from a second device (e.g., the server 130, or any other device described in connection with FIGS. 1-2). The first device may modify the navigation parameters (e.g., based on usage of a website/application by a user). The modified navigation parameters may be sent the modified navigation parameters to the second device. For example, the first device may be associated with a first banking application and the second device may be associated with a second banking application. By sharing navigation parameters between the first and second devices, a user may be able to experience the same navigation flow for both banking applications. Although one or more steps of FIG. 3 are described for convenience as being performed by a first server and/or a second server, one, some, or all of such steps may be performed by the server 130, the first user device 110, the second user device 120, the computing device 200, or one or more other computing devices, and steps may be distributed among one or more computing devices, including any computing devices such as those described in connection with FIGS. 1-2. One or more steps of FIG. 6 may be rearranged, modified, repeated, and/or omitted.

At step 605, a user may be authenticated by the first device. For example, the first device may receive a request to log in (e.g., as explained above in connection with step 305 of FIG. 3), or the first device may authenticate a token received from the first user device 110.

At step 610, the first device may determine whether a user account (e.g., associated with the user authenticated in step 605) indicates a custom navigation flow for the user. For example, the user account may store information indicating that the user is associated with a custom navigation flow. If the user account does not indicate a custom navigation flow, the method may proceed to step 612, where a default navigation flow may be displayed to the user (e.g., the website/application may display a home page, or other default information to the user). If the user account indicates a custom navigation flow, the method may proceed to step 615.

At step 615, the first device may send (e.g., transmit) a request for navigation parameters to the second device. The request may comprise an identifier (e.g., username, token, etc.) of the user that was authenticated in step 605. In some examples, the second device may request authentication credentials from the first device. In step 617, the first device may send one or more authentication credentials to the second device. For example, the first device may send a token or other information that allows the second device to authenticate the first device (e.g., the token may be the same as or different from the token discussed above in connection with step 605). In some examples, steps 615 and 617 may be combined in a single step. For example, the first device may send authentication credentials and the request for the navigation parameters in the same communication. Upon successful verification of the first device, the second device may retrieve navigation parameters (e.g., from the database 140) based on the identifier, and send the navigation parameters to the first device, for example, in step 620.

At step 625, the first device may determine one or more pages corresponding to the navigation parameters received from the second device. As note above with respect to FIGS. 3-5, the navigation parameters may comprise codes (e.g., as discussed above in connection with FIGS. 3-5) indicating a type of page. The first device may determine pages from a website/application (e.g., the banking application 162) associated with the first device that corresponds to the codes.

At step 630, the first device may determine an order of the one or more pages based on the navigation parameters (e.g., the navigation parameters may indicate an order as described above in connection with FIG. 3). At step 632, the first device may cause display of the one or more pages in the order (e.g., the user's preferred order instead of a default order) determined in step 635. The first device may cause the display to change from a first page to a second page based on one or more triggers indicated in the navigation parameters (e.g., as described above in connection with FIGS. 3-5).

At step 635, the first device may determine whether the navigation parameters requested in step 620 should be updated. For example, the first device may monitor the user's activity or interactions with the website/application associated with the first device (e.g., as described above in connection with step 310 of FIG. 3). The first device may determine whether to modify the navigation parameters based on the user's activity or interactions (e.g., as described above in connection with steps 310-320 of FIG. 3). At step 640, the first device may modify the navigation parameters that were requested in step 620 (e.g., as described above in connection with step 320).

At step 645, the first device may send the modified navigation parameters to the second device. At step 650, the second device may store (e.g., in the database 140) the modified navigation parameters for future use. For example, the second device may use the modified navigation parameters to cause display of a navigation flow of a website/application associated with the second device. A user may be able to experience the same navigation flow across multiple different websites/applications that are offered by different parties. Navigation parameters that are modified by one device may be shared with other devices so that the user does not need to modify the navigation flow at each website/application separately. This may increase the user-friendliness of one or more websites/applications and may lead to a better experience for the user of the one or more websites/applications.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present disclosure has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Thus, embodiments of the present disclosure should be considered in all respects as illustrative and not restrictive. Accordingly, the scope of the disclosure should be determined not by the embodiments illustrated, but by the appended claims and their equivalents.

What is claimed is:

1. A computer-implemented method comprising:
   receiving, by a first device and from a user device associated with a user, a first request to login to a first website associated with an industry, wherein the first request to login comprises one or more credentials;
   causing, based on verification of the one or more credentials, a first navigation flow to be displayed on the user device, wherein the first navigation flow comprises a first plurality of pages on the first website to be displayed in a first order;
   generating, based on an indication of navigation preferences received from the user device, one or more navigation parameters, wherein the one or more navigation parameters indicate a preferred order of output of the first plurality of pages, wherein the preferred order defines a persistent navigation flow for the user across a plurality of websites associated with the industry;
   updating the one or more navigation parameters based on an interaction between the user device and a page indicated by the first navigation flow, wherein the interaction comprises a quantity of time a user spends with the page;
   receiving, from the user device, a second request to login to a second website associated with the industry;
   generating, based on the second request to login and based on the updated one or more navigation parameters and the persistent navigation flow for the user, a second navigation flow to be displayed on the user device, wherein the second navigation flow causes a second plurality of pages on the second website to be displayed in an updated preferred order; and
   causing the second navigation flow to be displayed on the user device.

2. The method of claim 1, wherein the indication of navigation preferences comprises the preferred order of output of the first plurality of pages.

3. The method of claim 1, wherein the industry comprises at least one of: online shopping, social media, banking, news, sports or surveys.

4. The method of claim 1, further comprising:
   determining, based on the navigation parameters, a first code associated with a first page of the first plurality of pages;
   determining, based on the navigation parameters, a second code associated with a second page of the first plurality of pages, wherein:
      the second page is different from the first page; and
      the first code and the second code are configured to permit a second device to cause the second navigation flow to be displayed for the user device.

5. The method of claim 1, further comprising:
   sending, to a second device and based on a request from the second device, the one or more navigation parameters;
   receiving, from the second device, one or more modified navigation parameters comprising a second preferred order of the output of the first plurality of pages; and
   outputting, based on the one or more modified navigation parameters, a third navigation flow.

6. A computer-implemented method comprising:
   sending, by a first computing device and to a second computing device, a request for one or more navigation parameters associated with a preferred navigation flow, wherein the preferred navigation flow defines a persistent navigation flow for a user across a plurality of websites associated with an industry;
   based on verification of the first computing device, receiving the one or more navigation parameters;
   determining, based on the one or more navigation parameters, a first plurality of pages on a first website associated with the industry;
   determining, based on a correspondence between the first plurality of pages and the one or more navigation parameters, an order of output for the first plurality of pages;
   cause the first plurality of pages to be displayed on the first computing device in the order of output for the first plurality of pages;
   updating the order of output for the first plurality of pages based on an interaction between the first computing device and a page indicated by the preferred navigation flow, wherein the interaction comprises a quantity of time a user spends with the page;

determine, based on the persistent navigation flow, a second navigation flow to be displayed on the first computing device, wherein the second navigation flow causes a second plurality of pages on a second webpage associated with the industry to be displayed in the updated preferred order; and causing the second plurality of pages to be displayed on the first computing device according to the second navigation flow.

7. The method of claim 6, wherein the determining the first plurality of pages comprises determining each of the first plurality of pages based on codes indicated in the one or more navigation parameters.

8. The method of claim 6, further comprising:
modifying, by the first computing device and based on user interaction with the first plurality of pages, the navigation parameters; and
sending the modified navigation parameters to the second computing device.

9. The method of claim 6, wherein updating the order of output for the first plurality of pages comprises:
determining a first page of the first plurality of pages, wherein the user spends greater than a threshold quantity of time interacting with the first page; and
updating the order of output for the first plurality of pages to display the first page first in the order of output.

10. The method of claim 6, further comprising:
determining an additional page where a quantity of interactions performed by the user satisfies a threshold; and
after determining the additional page where the quantity of interactions performed by the user satisfies the threshold, modifying the navigation parameters to indicate the additional page.

11. A computing device comprising:
one or more processors; and
memory storing instructions that, when executed by the one or more processors, cause the computing device to:
receive, from a user device associated with a user, a first request to login to a first website associated with an industry, wherein the first request to login comprises one or more credentials;
cause, based on verification of the one or more credentials, a first navigation flow to be displayed on the user device, wherein the first navigation flow comprises a first plurality of pages on the first website to be displayed in a first order;
generate, based on an indication of navigation preferences received from the user device, one or more navigation parameters, wherein the one or more navigation parameters indicate a preferred order of output of the first plurality of pages, wherein the preferred order defines a persistent navigation flow for the user across a plurality of websites associated with the industry;
update the one or more navigation parameters based on an interaction between the user device and a page indicated by the first navigation flow, wherein the interaction comprises a quantity of time a user spends with the page;
receive, from the user device, a second request to login to a second website associated with the industry;
generate, based on the second request to login and based on the updated one or more navigation parameters and the persistent navigation flow for the user, a second navigation flow to be displayed on the user device, wherein the second navigation flow causes a second plurality of pages on the second website to be displayed in an updated preferred order; and
cause the second navigation flow to be displayed on the user device.

12. The computing device of claim 11, wherein the indication of navigation preferences comprises the preferred order of output of the first plurality of pages.

13. The computing device of claim 11, wherein the industry comprises at least one of: online shopping, social media, banking, news, sports or surveys.

14. The computing device of claim 11, wherein the instructions, when executed by the one or more processors, cause the computing device to:
determine, based on the navigation parameters, a first code associated with a first page of the first plurality of pages;
determine, based on the navigation parameters, a second code associated with a second page of the first plurality of pages, wherein:
the second page is different from the first page; and
the first code and the second code are configured to permit a second device to cause the second navigation flow to be displayed for the user device.

15. The computing device of claim 11, wherein the instructions, when executed by the one or more processors, cause the computing device to:
send, to a second device and based on a request from the second device, the one or more navigation parameters;
receive, from the second device, one or more modified navigation parameters comprising a second preferred order of the output of the first plurality of pages; and
output, based on the one or more modified navigation parameters, a third navigation flow.

16. A computing device comprising:
one or more processors; and
memory storing instructions that, when executed by the one or more processors, cause the computing device to:
send, to a second computing device, a request for one or more navigation parameters associated with a preferred navigation flow, wherein the preferred navigation flow defines a persistent navigation flow for a user across a plurality of websites associated with an industry;
based on verification of the computing device, receive the one or more navigation parameters;
determine, based on the one or more navigation parameters, a first plurality of pages on a first website associated with the industry;
determine, based on a correspondence between the first plurality of pages and the one or more navigation parameters, an order of output for the first plurality of pages;
cause the first plurality of pages to be displayed on the computing device in the order of output for the first plurality of pages;
update the order of output for the first plurality of pages based on an interaction between the computing device and a page indicated by the preferred navigation flow, wherein the interaction comprises a quantity of time a user spends with the page;
determine, based on the persistent navigation flow, a second navigation flow to be displayed on the first computing device, wherein the second navigation flow causes a second plurality of pages on a second webpage associated with the industry to be displayed in the updated preferred order; and cause the second plurality of pages to be displayed on the computing device according to the second navigation flow.

17. The computing device of claim 16, wherein the instructions, when executed by the one or more processors, cause the computing device to determine the first plurality of pages by:

determining each of the first plurality of pages based on codes indicated in the one or more navigation parameters.

18. The computing device of claim 16, wherein the instructions, when executed by the one or more processors, cause the computing device to:

modify, based on user interaction with the first plurality of pages, the navigation parameters; and send the modified navigation parameters to the second computing device.

19. The computing device of claim 16, wherein the instructions, when executed by the one or more processors, cause the computing device to update the order of output for the first plurality of pages by:

determining a first page of the first plurality of pages, wherein the user spends greater than a threshold quantity of time interacting with the first page; and updating the order of output for the first plurality of pages to display the first page first in the order of output.

20. The computing device of claim 16, wherein the instructions, when executed by the one or more processors, cause the computing device to:

determine an additional page where a quantity of interactions performed by the user satisfies a threshold; and after determining the additional page where the quantity of interactions performed by the user satisfies the threshold, modify the navigation parameters to indicate the additional page.

* * * * *